(12) United States Patent
De Roode et al.

(10) Patent No.: US 9,125,454 B2
(45) Date of Patent: Sep. 8, 2015

(54) CUSHIONING ELEMENT, FOOTWEAR, INSOLE, DEFORMABLE FILLING, AND ENVELOPE

(75) Inventors: Bartholomeus Mattheus De Roode, Rotterdam (NL); Marcel Geerdink, The Hague (NL)

(73) Assignee: S.C. Johnson & Son, Inc., Racine, WI (US)

( * ) Notice: Subject to any disclaimer, the term of this patent is extended or adjusted under 35 U.S.C. 154(b) by 753 days.

(21) Appl. No.: 13/390,963

(22) PCT Filed: Aug. 20, 2010

(86) PCT No.: PCT/NL2010/000124
§ 371 (c)(1),
(2), (4) Date: May 3, 2012

(87) PCT Pub. No.: WO2012/018252
PCT Pub. Date: Feb. 9, 2012

(65) Prior Publication Data
US 2012/0204451 A1     Aug. 16, 2012

(30) Foreign Application Priority Data
Aug. 20, 2009   (NL) .................................... 2003367

(51) Int. Cl.
*A43B 13/40*     (2006.01)
*A43B 5/00*      (2006.01)
*A43B 13/18*     (2006.01)
(Continued)

(52) U.S. Cl.
CPC ............. *A43B 13/189* (2013.01); *A43B 5/0405* (2013.01); *A43B 13/20* (2013.01)

(58) Field of Classification Search
CPC .... A43B 5/0405; A43B 13/18; A43B 13/187; A43B 13/188; A43B 13/189; A43C 3/16; A43C 27/086; A43C 27/12
USPC .................. 36/28, 29, 71, 43, 44; 5/644, 909; 106/122
See application file for complete search history.

(56) References Cited

U.S. PATENT DOCUMENTS

| 4,686,781 A | * | 8/1987 | Bury .............................. 36/132 |
| 5,617,650 A | * | 4/1997 | Grim .............................. 36/88 |
| 5,626,657 A |   | 5/1997 | Pearce |

(Continued)

FOREIGN PATENT DOCUMENTS

| DE | 101 38 426 | 12/2002 |
| EP | 1068460B1 B1 | 9/2002 |

(Continued)

OTHER PUBLICATIONS

International Search Report for International Application No. PCT/NL2010/000124, mailed Apr. 26, 2011, 7 pages.

*Primary Examiner* — Jila M Mohandesi

(57) ABSTRACT

Cushioning element (4) for footwear, having a deformable filling (12) and an envelope (10) that encloses the deformable filling. The envelope is arranged for forming at least one flow channel (837). In use, at least part of the deformable filling flows into the at least one flow channel as a result of increased pressure of the deformable filling caused by a mechanical load The deformable filling contains solid bodies and further contains a lubricating fluid for mutually lubricating the solid bodies. A dimension of the at least one flow channel is arranged for hindering entrance of the solid bodies into the at least one flow channel during cushioning.

24 Claims, 6 Drawing Sheets

(51) Int. Cl.
*A43B 5/04* (2006.01)
*A43B 13/20* (2006.01)

(56) References Cited

U.S. PATENT DOCUMENTS

| | | | |
|---|---|---|---|
| 5,718,063 A | 2/1998 | Yamashita | |
| 6,061,928 A * | 5/2000 | Nichols | 36/28 |
| 6,066,384 A * | 5/2000 | Crandall | 428/143 |
| 6,412,194 B1 * | 7/2002 | Carlson et al. | 36/43 |
| 6,792,699 B2 * | 9/2004 | Long et al. | 36/88 |
| 7,037,571 B2 * | 5/2006 | Fish et al. | 428/166 |
| 2003/0046831 A1 * | 3/2003 | Westin | 36/29 |
| 2005/0268490 A1 | 12/2005 | Foxen | |
| 2006/0010717 A1 * | 1/2006 | Finkelstein | 36/25 R |
| 2007/0261274 A1 * | 11/2007 | Fox et al. | 36/154 |
| 2007/0294917 A1 | 12/2007 | Holden et al. | |
| 2013/0145653 A1 * | 6/2013 | Bradford | 36/103 |

FOREIGN PATENT DOCUMENTS

| | | |
|---|---|---|
| JP | 63159501 U | 10/1988 |
| JP | 2000316606 A | 11/2000 |
| JP | 2002306280 A | 10/2002 |
| WO | WO-99/49236 | 9/1999 |

* cited by examiner

CUSHIONING ELEMENT, FOOTWEAR, INSOLE, DEFORMABLE FILLING, AND ENVELOPE

The invention relates to a cushioning element for footwear, having a deformable filling and an envelope that encloses the deformable filling. The invention also relates to an insole provided with the cushioning element. The invention further relates to footwear provided with the cushioning element and/or with the insole. Furthermore, the invention relates to the deformable filling. The invention also relates to the envelope.

Cushioning of footwear is important for reducing a mechanical load to a foot of a user of the footwear. During running for example, such loads can be relatively high, but also during walking significant loads are experienced by the user. Therefore, much footwear has a cushioning sole capable of absorbing, e.g. dissipating, part of the load. Known cushioning soles are often made of Ethylene Vinyl Acetate, commonly referred to as EVA material.

Another known cushioning sole is shown in U.S. Pat. No. 5,704,137, which relates to a hydrodynamic pad. As a result of a mechanical load, fluid inside the hydrodynamic pad is forced through a funnel so that part of the load is dissipated. At the same time, a seat for the heel of the user is formed, because the fluid flow changes an outer shape of the hydrodynamic pad. This seat formation as such however does not contribute to the process of cushioning. Instead, it rather hinders absorption of subsequent loads.

These and other known cushioning soles are useful but are still not ideal. In practice, some users such as athletes who may be prone to develop injuries, or normal users with a somewhat vulnerable bodily structure, nowadays still have problems finding shoes with sufficient cushioning.

It is therefore an object of the invention to provide an improved cushioning element for footwear.

Thereto the invention provides a cushioning element for footwear, having a deformable filling and an envelope that encloses the deformable filling, wherein the envelope is arranged for forming at least one flow channel, wherein, in use, at least part of the deformable filling flows into the at least one flow channel as a result of increased pressure of the deformable filling caused by a mechanical load, such as a mechanical shock, wherein the deformable filling contains solid bodies and further contains a lubricating fluid for mutually lubricating the solid bodies, wherein the at least one flow channel is dimensioned for hindering entrance of the solid bodies into the at least one flow channel during cushioning. As a result of the increased pressure, the lubricating fluid will in use flow into the at least one flow channel. This leads to an increased concentration of the solid bodies outside the at least one flow channel, which increases viscosity of the deformable filling outside the at least one flow channel. Such increased viscosity leads to higher energy dissipation. Thus, improved cushioning will be obtained, as cushioning can be achieved by dissipating the mechanical load. It may be clear that also users that do not have problems with known footwear, can benefit from increased comfort offered by the cushioning element.

It will be appreciated that a stronger load will lead to a stronger outflow of the lubricating fluid through the at least one flow channel, and thus to a stronger increase in viscosity of the deformable filling outside the at least one flow channel. In this way one and the same cushioning element can be used for users with varying body weight. For heavier users, more of the lubricating fluid flows out of the deformable filling, which leads to a stronger increase in viscosity and thus to stronger cushioning, as desired for the heavier user.

The inventor recognised that a change in composition of the deformable filling inside the envelope, i.e. a reversible separation of the deformable filling into a less viscous part and a more viscous part, enables improved cushioning. Such cushioning for example may be implemented without a substantial weight increase of the insole and thereby of the footwear. Such a substantial weight increase may occur if additional cushioning material like EVA is added to increase the cushioning capability of the footwear.

Preferably, the deformable filling containing the solid bodies in use behaves viscoelastically.

Preferably, the at least one flow channel is dimensioned for inhibiting entrance of the solid bodies into the at least one flow channel during cushioning. In this way, cushioning may be further improved.

In an embodiment, the solid bodies are substantially spherically shaped. In this way, uniform flow properties of the solid bodies throughout the deformable filling can be achieved.

In an embodiment, a diameter of the solid bodies is at least 0.1 millimeter and/or at most 2 millimeter. Solid bodies having a diameter larger than 2 millimeter may be felt by a user. This may be uncomfortable.

In an embodiment, the solid bodies are, at least partly, advantageously made of teflon. In use, the solid bodies may slide along each other when the deformable filling is being deformed. Teflon offers the advantage that it influences a friction coefficient of the solid bodies, so that flow properties of the deformable filling can be tuned by adjusting an amount of teflon in the solid bodies. A commercially attractive variant is achieved when, in an embodiment, the solid bodies are, at least partly, made of polyethyleen.

In an embodiment, a volume ratio of the solid bodies and the lubricating fluid is in a range between 1 and 10, preferably within a range between 1.5 and 5. In this way a relatively strong increase in viscosity can be obtained, for a relatively small amount of lubricating fluid flowing through the at least one flow channel.

In an embodiment, the viscosity of the lubricating fluid is arranged for, and the at least one flow channel is further dimensioned for, obtaining that the at least part of the deformable filling that flows, in use, into the at least one flow channel as a result of the pressure of the deformable filling caused by the mechanical load, is formed by at least 10% and/or at most 20% of a volume of the lubricating fluid of the deformable filling. Without wanting to be bound by any theory, such arrangement of the viscosity and such dimensioning of the at least one flow channel may be carried out by using the Hagen-Poisseuille equation, which as such is known to the skilled person.

In an embodiment, the square $A_c^2$ of a value $A_c$ of a cross-sectional area of the at least one flow channel, which cross-sectional area $A_c$ is transverse to a flow direction of the at least part of the deformable filling into the at least one flow channel, divided by the product of the viscosity $\eta$ of the lubricating fluid and a length L of the at least one of flow channel, is at least 0.001 cm³/(Pa·s) and/or at most 10 cm³/(Pa·s), so that $$0.001 \leq \frac{A_c^2}{\eta L} \text{ and/or } \frac{A_c^2}{\eta L} \leq 10,$$

and preferably is around 0.02 cm³/(Pa·s). The upper limit promotes that the lubricating fluid can flow away fast enough through the at least one flow channel. The lower limit promotes energy dissipation in the at least one flow channel.

In an embodiment, a total number of the flow channels is in a range from 3 to 12, preferably around 6. Having too many flow channels can be problematic, as a space within the cushioning element for accommodating all of these flow channels may be too small. This is especially important when the cushioning element is dimensioned for placement in an insole. Having too few flow channels however requires that the flow channels have a relatively large diameter. Again, accommodation within the cushioning element can become problematic, as a result of the relatively larger diameter. This is especially important when the cushioning element is dimensioned for placement in an insole.

No critical restriction is foreseen for a Young's modulus of the solid bodies. It is recognised by the inventors that relatively soft solid bodies may be beneficial as these may promote cushioning. However, hard solid bodies can also be used.

In an embodiment, a viscosity of the lubricating fluid is in a range from 0.001 to 1.5 Pa·s, preferably around 0.075 Pa·s.

Preferably, the solid bodies form a granular medium. Optionally, the solid bodies are colloidal particles.

The deformable filling containing a lubricating fluid for mutually lubricating the solid bodies offers an unexpected advantage. The inventor observed that many users have a tendency for choosing a cushioning element that is softer than needed for optimal cushioning. Such choosing often happens by touching the cushioning element using hands and fingers of the users. However, the forces that can be exerted on the cushioning element with hands and fingers are usually much smaller than the forces exerted on the cushioning element in use. Only few users realise this. The cushioning element of this embodiment has the property that it has improved cushioning properties when deformed by a relatively large force, such as caused by mechanical loads during running, and feels relatively soft when deformed with a relatively small force, such as exerted by hands and fingers. As a result, the users can still make a right choice, despite their tendency for choosing an insole that is too soft. This is realised by the deformable filling containing the solid bodies and the lubricating fluid. When deformed by the relatively small force, the lubricating fluid will flow between the solid bodies, so that the users experience a relatively soft cushioning element. However, when deformed with the relatively large force, the solid bodies will mutually interact so that the deformable filling as a whole effectively dissipates and/or stores the mechanical load. If this embodiment is combined with viscoelastic behaviour of the deformable filling, or if in use the deformable filling behaves viscously and the envelope behaves elastically, the deformable filling, in use, may behave predominantly viscous for the relatively small forces, while viscoelastic behaviour of the deformable filling or the envelope may occur for the relatively large forces applied during a time the mechanical load is applied.

In an embodiment, the envelope has an elastically variable volume. As a result, a volume enclosed by the envelope can, in use, be varied. The elastically variable volume can for example be achieved when the at least one flow channel is in fluidum connection with a resilient member. By means of the elastically variable volume part of the mechanical load can be elastically stored in the envelope, which improves cushioning.

In an embodiment, the envelope is provided with at least one deformable portion that has a reduced rigidity compared to a remaining portion of the envelope, wherein the envelope is arranged for forming the at least one flow channel by developing, substantially reversibly, a bulge in the at least one deformable portion as a result of increased pressure of the deformable filling exerted on the at least one deformable portion, caused by the mechanical load. More in general, the inventor recognised the value of providing, in an aspect separate from the invention, a cushioning element for footwear, having a deformable filling and an envelope that encloses the deformable filling, wherein the envelope is provided with at least one deformable portion that has a reduced rigidity compared to a remaining portion of the envelope, wherein the cushioning element is arranged for developing, substantially reversibly, a bulge in the at least one deformable portion as a result of increased pressure of the deformable filling exerted on the at least one deformable portion, caused by a mechanical load. It may be clear that, according to this aspect, the deformable filling may or may not contain the solid bodies and the lubricating fluid. In this embodiment, and according to this more general aspect, one or more of three advantages can be realised. Firstly, because elastic energy is stored in the deformable portion when forming the bulge, cushioning is further improved. Secondly, the, substantially reversibly, deformable portion enables restoration of the cushioning element towards its original shape, after the mechanical load is dissipated and/or elastically stored. Thirdly, as a result of the pressure, the lubricating fluid in use will flow into the bulge, so that at least part of the energy of the mechanical load will be dissipated. Such dissipation improves cushioning. It is noted that in this embodiment, elastic energy dissipated in the deformable filling outside the at least one flow channel (and inside the envelope) preferably is dominant over elastic energy storage in the deformable portion and energy dissipation inside the at least one flow channel. However, in the aspect separate from the invention, this can be different. For example, in the aspect separate from the invention, the energy dissipation inside the at least one flow channel may be dominant.

The elastically variable volume can for example be achieved when the envelope is provided with the at least one deformable portion.

By means of the resilient member or the at least one deformable portion, in combination with the deformable filling, viscoelastic behaviour of the cushioning element can be achieved.

In use, developing the bulge is substantially reversible. This means that in use the bulge can be developed repeatably, without fracturing or other significant irreversible yielding of the at least one deformable portion. It also means that the cushioning element is arranged for having the bulge disappear after the mechanical load is released. Such disappearance may for example occur as a result of elastic energy stored in the at least one deformable portion. In this case it is recognised by the inventor that a time for disappearance of the bulge is usually larger than a time for developing the bulge, as the energy of the mechanical load is usually larger than the elastic energy stored in the at least one deformable portion. During use however, subsequent loads may occur so often that the bulge only has time to partly disappear.

The at least one deformable portion has a reduced rigidity compared to a remaining portion of the envelope. This can be achieved by the deformable portion being made of a less rigid material than the remaining portion. Alternatively or additionally, this can be achieved by the deformable portion having a different shape, for example being thinner, than the remaining portion of the envelope.

The inventor recognised the possible value of cushioning by means of a change in shape, i.e. the development of one or more bulges, of the envelope. Such cushioning for example may be implemented without a substantial weight increase of the footwear. Such a substantial weight increase may occur if additional cushioning material like EVA is added to increase the cushioning capability of the footwear.

In an embodiment, in use, dissipation of the deformable filling changes in time under influence of the developing bulge. This is different than in U.S. Pat. No. 5,704,137, where dimensions of the funnel are static. Thus, the cushioning element in this embodiment offers an additional advantage over U.S. Pat. No. 5,704,137 in that it enables implementation of an increasingly stronger dissipation when the bulge develops. For example, the bulge may get longer so that a flow path of the deformable filling into the bulge becomes longer, thus increasing dissipation and improving cushioning. Preferably, the cushioning element is arranged for having the deformable filling flow into the bulge as a result of the pressure of the deformable filling. In this way the bulge develops. Preferably, a size of the deformable portion is adapted for having a dimension of the bulge in a direction of the flow of the deformable filling into the bulge that is larger than a dimension of the bulge transverse to the direction of the flow of the deformable filling into the bulge. Such a geometry of the bulge increases dissipation of the mechanical load.

In an embodiment, the remaining portion of the envelope includes a support member that comprises at least one aperture to define the at least one deformable portion. Preferably, the support member has an increased rigidity compared to the at least one deformable portion of the envelope. Preferably, the support member limits motion of the remaining portion of the envelope. If the support member has an increased rigidity compared to the at least one deformable portion of the envelope, and/or limits motion of the remaining portion of the envelope, it can be achieved that the at least one deformable portion has a reduced rigidity compared to the remaining portion of the envelope. The support member may form a protection of the envelope against mechanical damage, which may result for example from impact of sharp objects on the cushioning element during its use.

Preferably, the support member surrounds the deformable filling.

In an embodiment, the support member has at least one funnel that extends from the aperture and is arranged to receive the at least one bulge. The funnel may ensure that the dimension of the bulge in the direction of the flow of the deformable filling is much larger than the dimension of the bulge transverse to the direction of the flow of the deformable filling. Thereto a ratio of maximum length and maximum width of the funnel preferably is larger than 1, more preferably larger than 5, and in particular larger than 10.

In an embodiment, the funnel has a restriction arranged for limiting a size of the bulge. In this way, a size of the bulge in a longitudinal direction of the funnel can be limited. The restriction is especially useful for maintaining resilience of the deformable portion, which may be compromised if the deformable portion is deformed too much. It will be clear that thus a cushioning element can be provided where funnel dimensions, i.e. a funnel width and a funnel length, and material properties, i.a. a Young's modulus and a critical strain at which significant irreversible yielding occurs, of the deformable portion are choosen such that the cushioning element is arranged for developing the bulge in the at least one deformable portion as a result of increased pressure of the deformable filling exerted on the at least one deformable portion, caused by the mechanical load, substantially reversibly.

In an embodiment, the restriction is formed by a closed end wall of the funnel. In this way protection of the envelope against mechanical damage, which may result for example from impact of sharp objects on the cushioning element during its use, can be further improved.

In an embodiment, the at least one deformable portion comprises a resilient material. Preferably, the resilient material is an elastic material, more preferably the resilient material is an anelastic material. The anelastic material dissipates energy when being deformed, however without developing irreversible deformations.

In an embodiment, the at least one deformable portion is one of a plurality of mutually similar deformable portions. Preferably, the bulge is one of a plurality of mutually similar bulges. Preferably, the cushioning element is arranged for developing, substantially reversibly, the plurality of bulges from the respective deformable portions as a result of increased pressure of the deformable filling exerted on the plurality of deformable portions, caused by the mechanical load. An increased amount of bulges in the plurality of bulges increases the capability of cushioning of the cushioning element. For example, the amount of bulges, and/or an amount of deformable portions, may be at least 10, at least 50, at least 100, at least 500, at least 1000, at least 5000, and/or at least 10000. Increasing the amount of bulges may lead to a decreased size of the bulges, as all bulges still have to fit on the cushioning element. In general, smaller bulges can increase dissipation of the mechanical load, as the deformable filling will flow through smaller openings so that it can dissipate more energy. When being undeformed, a surface area of one of the deformable portions may be smaller than 10 $mm^2$, preferably smaller than 5 $mm^2$, more preferably smaller than 1 $mm^2$.

The cushioning element is provided with the deformable filling. It may be clear that such a combination of the cushioning element and the deformable filling is valuable. However, the cushioning element without the deformable filling, and the deformable filling as such, are also considered valuable.

In an embodiment, the deformable filling and/or the lubricating fluid is, at least partly, formed by at least one of a viscoelastic fluid and a viscoelastic solid. Such a fluid and solid in use behave viscoelastically. Viscoelastic behaviour offers the advantage of cushioning by both dissipation (by viscous behaviour) and elastic storage (by elastic behaviour). Usually, when the mechanical load develops, elastic behaviour precedes viscous behaviour. A viscoelastic solid has the special advantage that it is capable of substantially retaining by itself its original shape after being deformed by the mechanical load.

In an embodiment, the deformable filling and/or the lubricating fluid is, at least partly, formed by a shear-thickening fluid. Preferably, the shear-thickening fluid shows an increase in effective viscosity at conditions, such as a shear rate and temperature, that are prevalent in or near the bulge during exertion of the mechanical load. The shear-thickening behaviour effectively increases dissipation of energy of the mechanical load.

Preferably, the deformable filling includes a fluid and a solid, rather than a gas.

It is another object of the invention to provide an insole with improved cushioning.

Thereto the invention provides an insole with the cushioning element.

Preferably, the cushioning element is separable from the insole. For example, the cushioning element is a part of the insole that can be provided with a new cushioning element.

It is another object of the invention to provide footwear with improved cushioning.

Thereto the invention provides footwear, such as an athletic shoe, provided with the cushioning element and/or provided with the insole.

Preferably, the cushioning element and/or the insole is separable from the footwear. For example, the cushioning element and/or the insole is a replaceable part of the footwear. In this way, the footwear can be provided with a new cushioning element and/or a new insole.

It is another object of the invention to provide a deformable filling for use in an improved cushioning element for footwear.

Thereto the invention provides the deformable filling of one of claims 1-23.

The invention will now be described, in a non-limiting way, with reference to the accompanying drawings, in which.

Figure 4A:
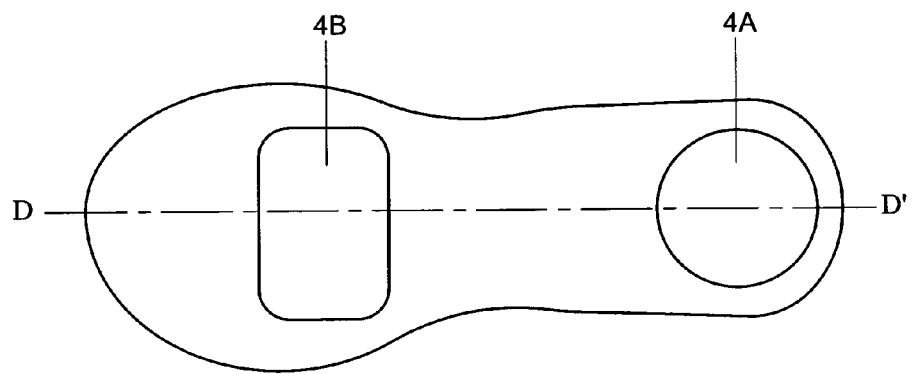
Figure 4B:
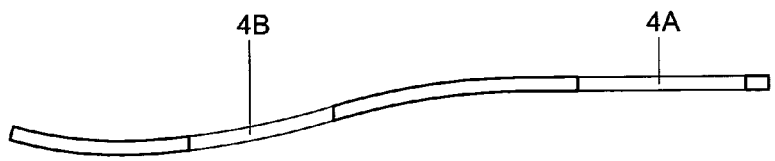
Figure 5A:
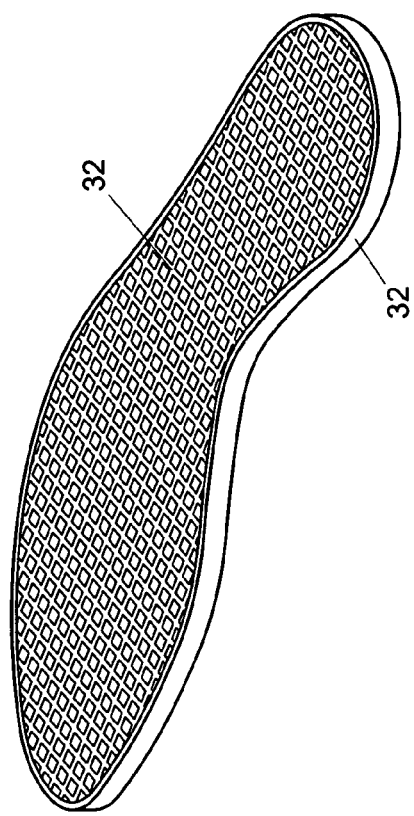
Figure 5B:
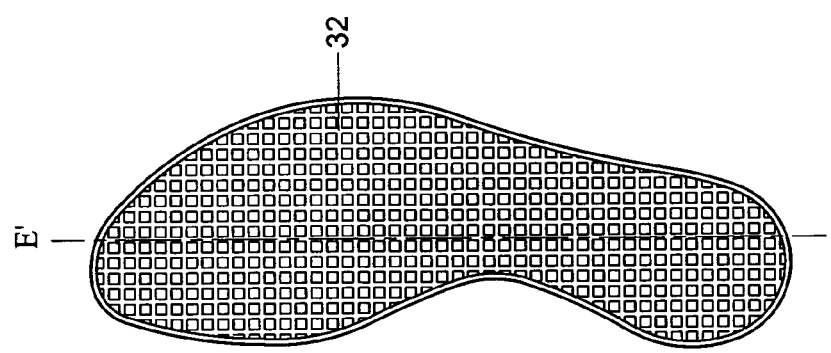
Figure 5C:
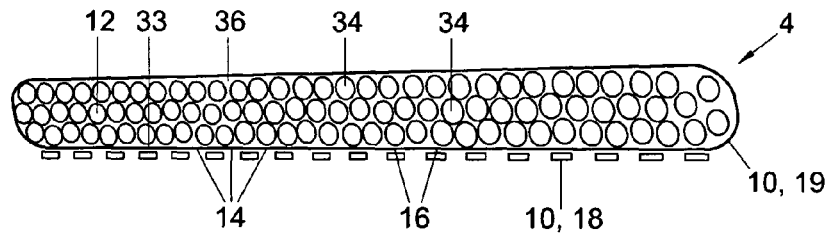
Figure 5D:
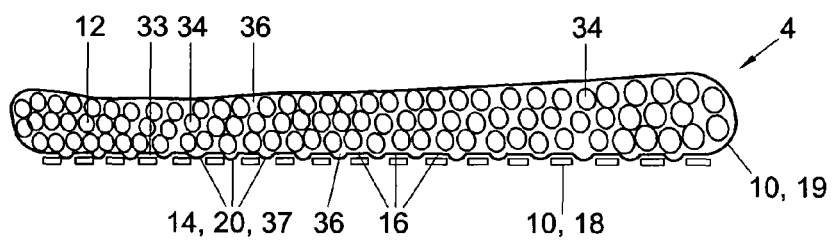
Figure 5E:
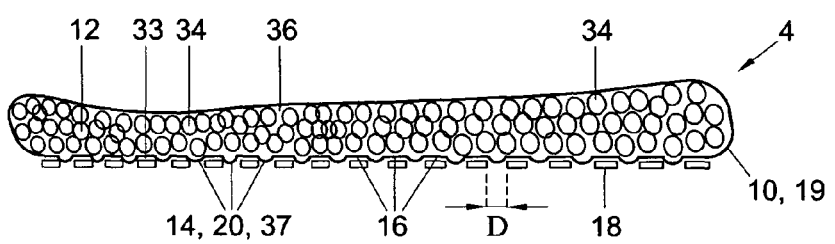
Figure 5F:
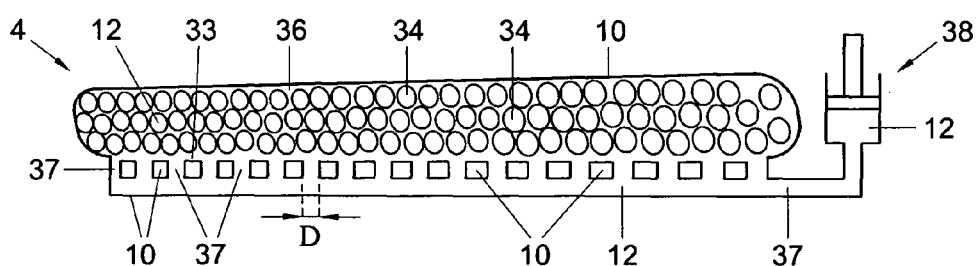
Figure 6:
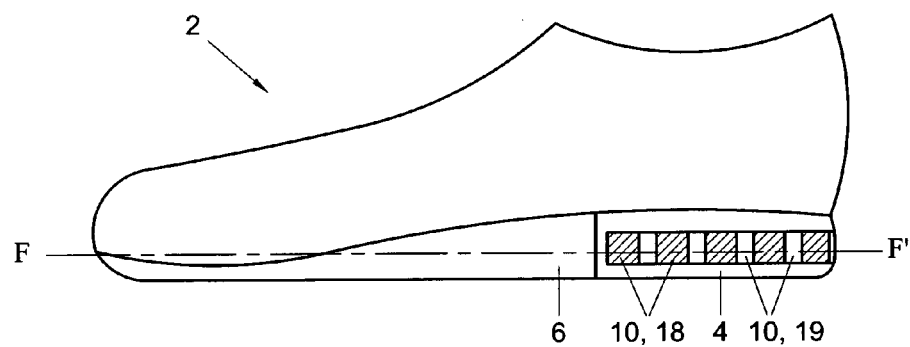
Figure 7A:
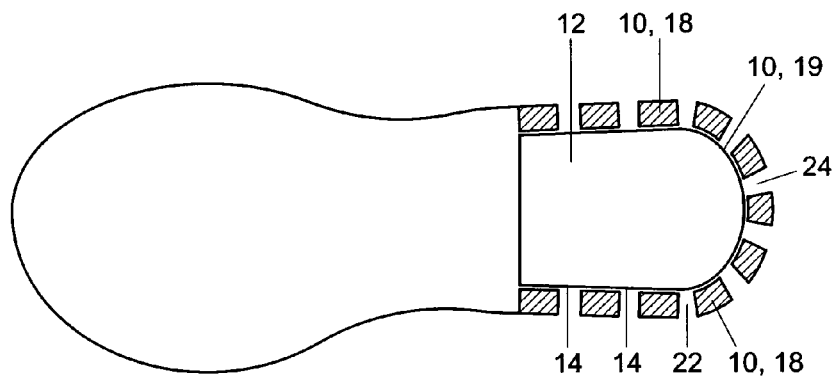

FIG. 4A schematically shows an insole in an embodiment according to the invention;

FIG. 4B shows the insole of FIG. 4A is a cross section, indicated in FIG. 4A;

FIG. 5A shows a perspective view of an insole in a second embodiment according to the invention;

FIG. 5B shows a top view of the insole of FIG. 5A;

FIG. 5C schematically shows, in a cross section as indicated in FIG. 5B, a cushioning element in a second embodiment, in an undeformed state;

FIG. 5D schematically shows, in a cross section as indicated in FIG. 5B, a cushioning element in a second embodiment, in a first deformed state;

FIG. 5E schematically shows, in a cross section as indicated in FIG. 5B, a cushioning element in a second embodiment, in a second deformed state;

FIG. 5F shows a variation of the cushioning element in the second embodiment, in an undeformed state;

FIG. 6 shows a cushioning element in a third embodiment according to the invention;

FIG. 7A shows a cushioning element in a cross section, indicated in FIG. 6, in an undeformed state.

Figure 7B:
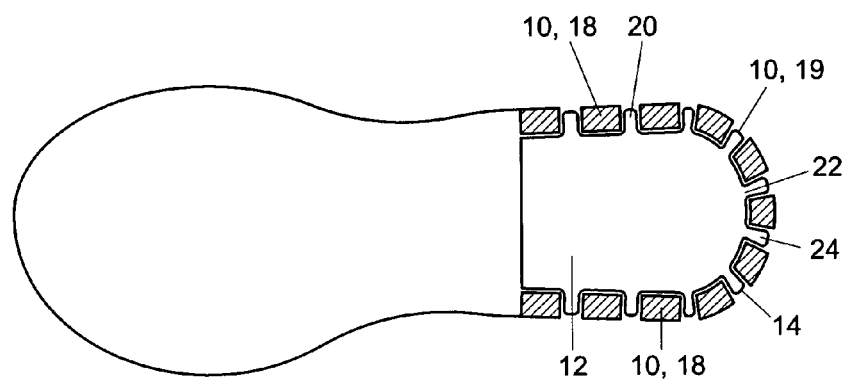

FIG. 7B shows a cushioning element in a cross section, indicated in FIG. 6, in a deformed state.

Unless stated otherwise, like reference numerals refer to like elements throughout the drawings.

Figure 1:
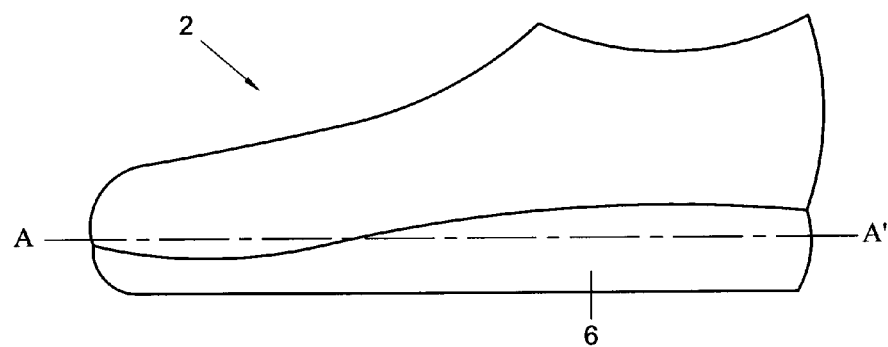
FIG. 1 shows a side view of a shoe.

FIG. 1 shows a side view of a shoe 2, being an example of footwear. The shoe 2 is provided with a cushioning element in a first embodiment according to the invention. The side view of FIG. 1 does not show the cushioning element, which however is shown in FIGS. 2A, 2B, 3A, and 3B with reference number 4. The shoe may be an athletic shoe, that is adapted for running. For these shoes a good cushioning is important. However, the shoe 2 may also be of another type, such as a shoe for daily use or a shoe adapted for outdoor use such as hiking. Also for these types of shoes, it is beneficial to increase cushioning, for example for increasing wearing comfort.

The shoe 2 is provided with a sole 6. The cushioning element 4 may be integrated with the sole 6. The sole 6 and an outer part of the cushioning element 4 may contain the same material, for example EVA (Ethylene Vinyl Acetate), and may optionally be made out of one piece. However, the cushioning element 4 in this example can be separated from the shoe 2. More in general, the cushioning element 4 may be provided as a separable part of the shoe 2.

In this example, the cushioning element 4 forms a, separable, rear part of the shoe 2. As a lot of people tend to touch the ground with their heel first when running or walking, this rear position of the cushioning element 4 can be considered advantageous. However, when running at a relatively high speed, a lot of people tend to touch the ground with their fore-foot first. Therefore, it can also be considered advantageous if the cushioning element forms part of a front part of the shoe 2. It thus is clear that, more in general, the cushioning element may be positioned, in use, below a heel and/or a ball of a foot of a user. More in general, the cushioning element may be arranged for extending along substantially the whole foot sole of the user.

It is noted that, more in general, cushioning may include dissipating and/or elastically storing the mechanical load, such as a mechanical shock, exerted on the cushioning element 4 by the foot of the user, e.g. when landing on the foot during walking and/or running. Such storing may be achieved by elastically storing at least part of the mechanical load in the cushioning element 4.

Figure 2A:
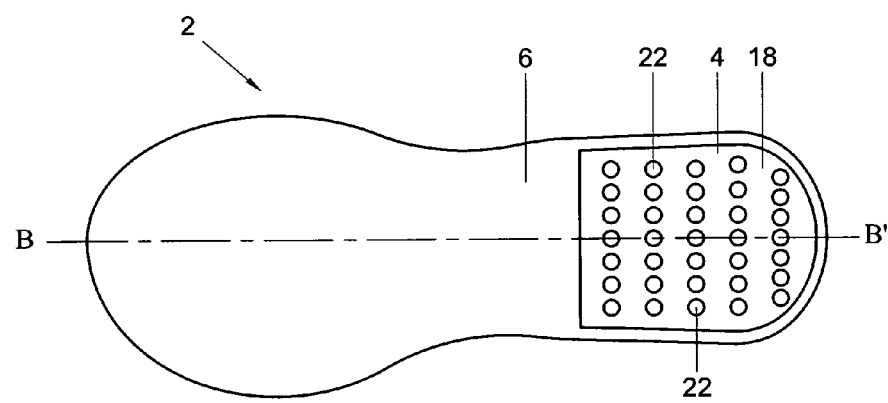
FIG. 2A shows a shoe with a cushioning element in a cross section, indicated in FIG. 1.
Figure 2B:
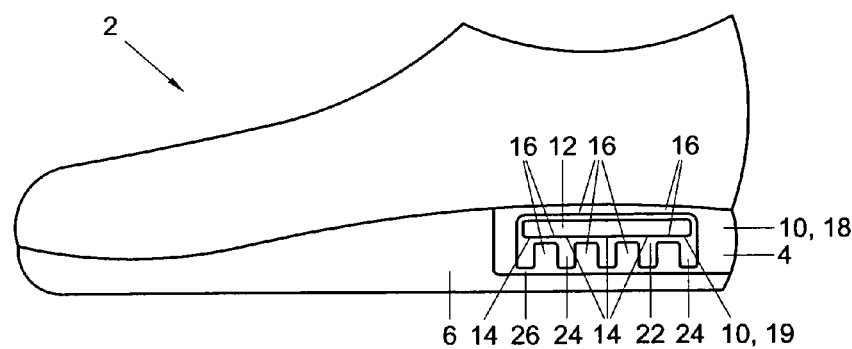
FIG. 2B shows a shoe with a cushioning element in a cross section, indicated in FIG. 2A.

The cushioning element 4 in the first embodiment is illustrated in FIGS. 2A, 2B, 3A, and 3B. FIG. 2A shows the shoe 2 with the cushioning element 4 in a cross section A-A', indicated in FIG. 1. FIG. 2B shows the shoe 2 with the cushioning element 4 in a cross section B-B', indicated in FIG. 2A. FIGS. 2A and 2B show the cushioning element in an undeformed state. Such an undeformed state my be present when no mechanical load is being dissipated and/or elastically stored.

Figure 3A:
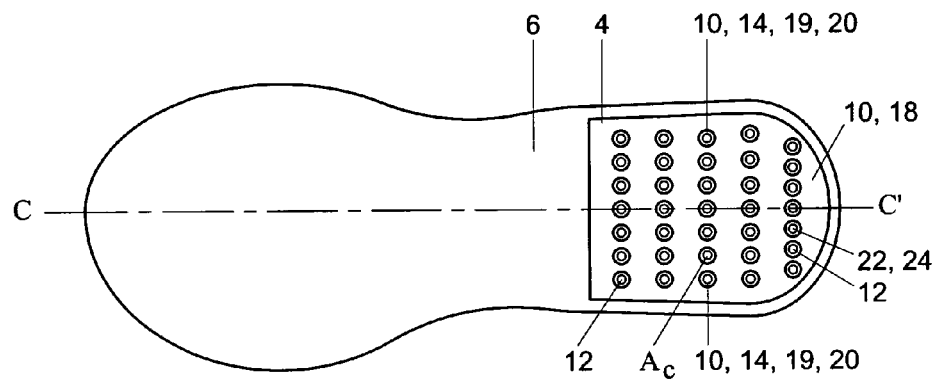
FIG. 3A shows a shoe with a cushioning element in a cross section, indicated in FIG. 1.
Figure 3B:
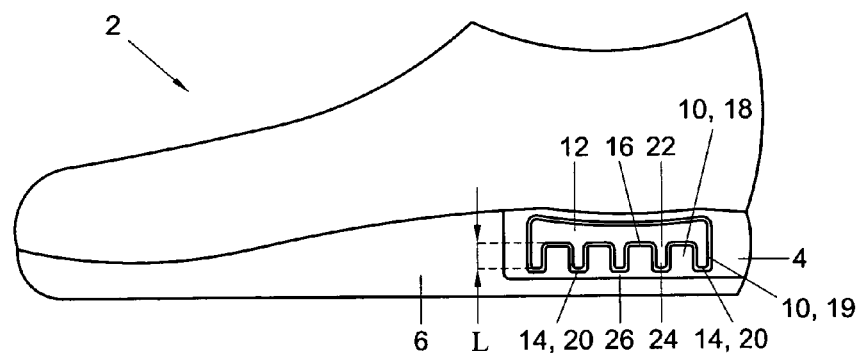
FIG. 3B shows a shoe with a cushioning element in a cross section, indicated in FIG. 3A.

FIG. 3A shows the shoe 2 with the cushioning element 4 in the cross section A-A', indicated in FIG. 1. FIG. 3B shows the shoe 2 with the cushioning element 4 in a cross section C-C', indicated in FIG. 3A. FIGS. 3A and 3B show the cushioning element in a deformed state. Such a deformed state my be present during cushioning.

With reference to FIGS. 2A and 2B, the cushioning element 4 has an envelope 10 and a deformable filling 12. Dissipating the mechanical load may be achieved by deforming the deformable filling 12. The envelope 10 may enclose the deformable filling 12. In this example, the cushioning element 4 is provided with the deformable filling 12. The deformable filling 12 may, at least partly, be formed by a shear-thickening fluid. Alternatively or additionally, the deformable filling may be, at least partly, formed by at least one of a viscoelastic fluid and a viscoelastic solid.

The deformable filling 12 may contain solid bodies. The term solid body is interpreted broadly. The term may cover various kinds of particles or grains. The solid bodies may be relatively soft or relatively hard. A viscoelastic body is also considered a solid body, as well as a capsule with therein contained a viscous liquid. More in general, an average density of the solid bodies is matched to, e.g. is equal to, a density of the lubricating fluid. In this way precipitation or deposition of the solid bodies may be prevented.

The envelope 10 is provided with at least one deformable portion 14. In this example, the at least one deformable portion 14 is one of a plurality of mutually similar deformable portions 14. In use, the deformable portions 14 have a reduced rigidity compared to a remaining portion of the envelope 10. In the first embodiment, this reduced rigidity is achieved by restricting motion of the remaining portion 16 of the envelope 10. This restricting is achieved in this example by the presence of a support member 18 that is included by the remaining portion of the envelope 10. Here, the support member 18 surrounds the deformable filling 12.

In the first embodiment, the support member 18 and the inner part 19 of the envelope 10 are mutually attached. Optionally, the support member 19 and the inner part 19 of the envelop 10 may be made out of one piece. It may be clear that portions of the inner part 19 that are attached to the support member 18 are part of the remaining portion of the envelope. However, alternatively the support member 18 and the inner part 19 of the envelope 10 may be separable parts of the envelope 10. More in general, is noted that the inner part 19 of the envelope 10 may be of relatively uniform composition and thickness.

The cushioning element 4 is arranged for developing, substantially reversibly, a bulge 20 in the at least one deformable portion as a result of increased pressure of the deformable filling 12 exerted on the at least one deformable portion 14, caused by the mechanical load. In the first embodiment, the cushioning element 4 is arranged for developing, substantially reversibly, a plurality of bulges 20 from the respective deformable portions 14 as a result of increased pressure of the deformable filling 12 exerted on the plurality of deformable portions 14, caused by the mechanical load.

The support member 18 comprises at least one aperture 22 to define the at least one deformable portion 14. As a result, the aperture is present at a position of the at least one deformable portion 14. This is one way in which the cushioning element 4 can be arranged for developing, substantially reversibly, the bulge 20 in the at least one deformable portion as a result of increased pressure of the deformable filling 12 exerted on the at least one deformable portion 14, caused by the mechanical load.

In the first embodiment, the support member 18 has at least one funnel 24 that extends from the aperture 22 and is arranged to receive the at least one bulge 20. The at least one aperture 22 may be one of a plurality of apertures 22. The at least one funnel 24 may be one of a plurality of mutually similar funnels 24. The funnels 24 may be arranged for guiding the bulges 22.

The funnels 24 may have a restriction arranged for limiting a size of the bulge. In this example, such restrictions are formed by closed end walls 26 of the funnels that close off the funnels 24. In this example, the closed end walls 26 are formed by the support member 18. More in general, the funnels 24 and apertures 22 may be formed by cavities in the support member 18.

In the cross sections of FIGS. 2A and 3A, the funnels have a substantial circular shape. It may be clear that, in general, the funnels in these cross sections may have another shape as well, such as a rectangular shape, an ellipsoidal shape, or an elongated shape such as a channel shape or a slotted shape.

In FIGS. 2A, 2B, 3A, and 3B, the cushioning element 4 is described as a separable element placed in the shoe 2. An insole in a first embodiment according to the invention, includes the cushioning element 4. The cushioning element 4 may be separable from the insole, but alternatively may be integrated with the insole. The insole may, in use, support a rear part and/or a front part of a foot sole of the user. Optionally, the insole in use covers substantially the whole foot sole. FIG. 4A schematically shows the insole 30 in the first embodiment according to the invention. FIG. 4B shows the insole 30 of FIG. 4A is a cross section D-D', indicated in FIG. 4A. The insole 30 of FIGS. 4A and 4B is provided with a first cushioning element 4A for supporting a rear part of the foot sole, and is provided with a second cushioning element 4B for supporting a front part of the foot sole. However, one of the first cushioning element 4A and the second cushioning element 4B may be lacking. More in general, the cushioning element 4 may extend along substantially the whole insole 30. As a result, in use the cushioning element 4 will extend along substantially the whole foot sole, thus maximising wearing comfort.

FIG. 5A shows a perspective view of an insole in a second embodiment according to the invention. FIG. 5B shows a top view of the insole in the second embodiment. The insole in the second embodiment may include a cushioning element in a second embodiment according to the invention. The insole may further include a protective cover 32.

FIG. 5C schematically shows, in a cross section E-E' as indicated in FIG. 5B, the cushioning element 4 in the second embodiment, in an undeformed state. FIG. 5D schematically shows, in the cross section E-E' as indicated in FIG. 5B, the cushioning element 4 in the second embodiment, in a first deformed state. FIG. 5E schematically shows, in the cross section E-E' as indicated in FIG. 5B, the cushioning element 4 in the second embodiment, in a second deformed state. The cushioning element 4 may be provided with the envelope 10, the plurality of deformable portions 14, and the remaining portion 16 of the envelope 10 that includes the support member 18. During cushioning, the remaining portion 16 may have an increased rigidity compared with the plurality of deformable portions 14. In this example, the inner part 19 of the envelope 10 abuts an inner surface 33 of the support member 18 during cushioning. As a result of friction between the inner part 19 of the envelop 10 and the inner surface 33 of the support member 18, motion of the remaining portion of the envelop 10 is restricted so that the remaining portion 16 of the envelope 10 has a reduced rigidity compared to the deformable portions 14 that do not abut the inner surface of the support member 18. This friction may be caused by the pressure in the deformable filling 12 as a result of the mechanical load. Alternatively or additionally, such friction may be caused by an adhesive such as glue applied to the inner surface 33 of the support member 18.

In the first deformed state of FIG. 5D and the second deformed state of FIG. 5E, flow channels 37 have formed in the form of the bulges 20. The bulges 20 have expanded as a result of the lubricating fluid 36 flowing into the bulges 20. In this example, the flow channels 37 are dimensioned for hindering entrance of the solid bodies into the flow channels 37. This hindering, such as inhibiting, can for example be established by choosing a diameter of the solid bodies 34 to be larger than a diameter D of the flow channels 37.

It may be clear however that, in a variation of the second embodiment, the flow channels 37 may lack the deformable portions 14. Such a variation of the cushioning element 4 is shown is FIG. 5F, in an undeformed state. The envelope 10 is arranged for forming the flow channels 37. In use, at least part of the deformable filling, in this example at least part of the lubricating fluid 36, flows into the flow channels 37 as a result of increased pressure of the deformable filling 12 caused by the mechanical load. In this example, the flow channels 37 are in fluidum connection with a resilient member, here schematically represented by a piston 38. Motion of a spring plunger of the piston 38 is restricted by a spring (not shown). The, preferably elastic, resilient member may be positioned at an end of the flow channels 37.

The second deformed state of FIG. 5E represents a more strongly deformed state than the first deformed state of FIG. 5D. In the second deformed state, the solid bodies are packed more closely than in the first deformed state. As a result, a viscosity of the deformable filling 12 is larger in the first deformed state than in the second deformed state. Such an increase in viscosity leads to an improved cushioning. More in general, a volume ratio $V_{solid}/V_{liquid}$ of the solid bodies and the lubricating fluid is preferably choosen such that the viscosity of the deformable filling 12 outside the flow channels 37 increases relatively strongly as a result of a relatively small increase of the choosen volume ratio. ($V_{solid}$=volume of the solid bodies in the deformable filling; $V_{liquid}$=volume of the lubricating fluid in the deformable filling). Such a volume ratio may be choosen by using the simplified Krieger-Dougherty equation:

$$\eta = \eta_0 \left(1 - \frac{\Phi}{\Phi_m}\right)^{-2}$$

Wherein $\eta$ is the viscosity of the deformable filling, $\eta_0$ is the viscosity of the lubricating fluid, $\Phi=V_{solid}/(V_{solid}+V_{liquid})$ is a volume fraction of the solid particles, and $\Phi_m$ is a critical volume fraction of the solid particles (i.e. a volume fraction at which the deformable filling has reached a maximum). For example, the chosen volume ratio may be in a range from 1 to 10, preferably in a range from 1.5 to 5. Accordingly, the volume fraction $\Phi$ of the solid bodies in the deformable filling is in a range from 0.5 to 0.91, preferably in a range from 0.60 to 0.83. If the volume of the solid bodies in the deformable filling is too large, the deformable filling is too stiff and cushioning is insufficient. If the volume of the solid bodies is too small, a viscosity increase during cushioning is too small so that cushioning will be insufficient as well. It is recognised by the inventor that the viscosity increase during cushioning depends i.a. on a particle size distribution and a shape of the solid particles.

The critical volume fraction $\Phi_m$ for example is in a range from 0.64 to 0.74 for spherical particles of substantially uniform size. It is noted that for non-uniform size distributions of the solid particles, and/or for non-spherically shaped particles, $\Phi_m$ can be outside, in particular above, this range.

The second deformed state may be reached at a later instance during cushioning than the first deformed state. Alternatively, the first deformed state may be reached shortly after cushioning, during recovery of the cushioning element in order to dissipate and/or store a next mechanical load.

The cushioning element 4 in the second embodiment, and the variation thereof, is provided with the deformable filling 12 that contains the solid bodies 34. Such a deformable filling 12 is usually referred to as a granular medium. The deformable filling 12 in the second embodiment and the variation thereof further includes a lubricating fluid 36. In use, the lubricating fluid lubricates the solid bodies 34. The deformable filling may be arranged for having viscoelastic behaviour during cushioning. This may be achieved by proper tuning of the viscosity of the lubricating fluid, the elastic properties of the solid bodies, the shape of the solid bodies, the size of the solid bodies, and the volume ratio of the solid bodies and the lubricating fluid.

The lubricating fluid may include water and/or glycerol. These fluids are mutually miscible and the viscosity and/or density of the mixture thus obtained can be tuned over a fairly wide range (i.e. between the viscosity and/or density of water and the viscosity of glycerol) by varying the ratio of water and glycerol.

In this example, the solid bodies are substantially spherically shaped and may have a diameter in a range between 0.1 millimeter and 2 millimeter. The solid bodies may include teflon.

In the second embodiment and the variation thereof, and optionally in the first embodiment, in use at least 10% and at most 20% of a volume of the lubricating fluid may flow out of the deformable filling into the flow channels 37 as a result of the increased pressure as a result of one mechanical load. In order to achieve this, a dimension of the flow channels 37 may be adapted. In addition, a viscosity of the lubricating fluid may be adapted. More in general, a total number and a length of each one of the flow channels 37 is chosen when such adaptations are made.

In an example, the viscosity of the lubricating fluid is equal to 75 mPa·s, the total number of channels equals 6, a length L of each one of the flow channels 37 is 10 cm, the flow channels 37 may be mutually separate, and a diameter of a (circular) cross section of the channels equals 4 millimeters. It may be clear however, that other combinations and options are possible as well. For such combinations, the square $A_c^2$ of a value $A_c$ (FIG. 3A) of a cross-sectional area $A_c$ of one of the flow channels 37, which area $A_c$ is transverse to a flow direction of the at least part of the deformable filling into the flow channels, divided by the product of the viscosity $\eta$ of the lubricating fluid times a length L (FIG. 3B) of that one of the flow channels 37, may be in a range from 0.001 cm$^3$/(Pa·s) to 10 cm$^3$/(Pa·s), preferably around 0.02 cm$^3$/(Pa·s). This is based on the Hagen-Poisseuille equation. It may therein assume that the mechanical load takes about 0.5 seconds. It may further be assumed that, during the mechanical load, a pressure in a range from about 40 N/cm$^2$ (walking) to about 80 N/cm$^2$ (running) is exerted on the deformable filling. The cross-sectional area $A_c$ may be equal to $\pi R^2$ in case the channels 37 have a circular cross-section. Alternatively, the cross-section area $A_c$ may be equal to a width times a height of the channels 37 in case the channels 37 have a rectangular cross-section.

In this example, and in such other combinations, an advantageous effect can be obtained. Typically at least 10% and at most 20% of a volume of the lubricating fluid is pushed through the flow channels as a result of one mechanical load, during the one mechanical load.

FIG. 6 shows a cushioning element 4 in a third embodiment according to the invention. The cushioning element 4 of FIG. 6 is integrated with the sole 6 of the shoe 2. FIG. 6 further shows the envelope 10 having the support member 18, included by the cushioning element 4. The cushioning element 4 may further be provided with the deformable filling 12.

FIGS. 7A and 7B show the cushioning element 4 in a cross section F-F', indicated in FIG. 6. FIG. 7A shows the cushioning element in an undeformed state, while FIG. 7B shows the cushioning element 4 in a deformed state. In FIGS. 7A and 7B, the support member 18 forms the funnels 24 and the apertures 22. The cushioning element in the third embodiment is arranged for developing, substantially reversibly, the bulges 20 in the deformed state. Such bulge formation results from pressure of the deformable filling 12 exerted on the deformable portions 14 of the envelope 10. In turn, the pressure is caused by the mechanical load, so that bulge formation is caused by the mechanical load.

In the embodiments described above, the at least one deformable portion may comprises a resilient material. The resilient material may contain rubber. A Young's modulus of the resilient material may be adapted such that a proper resilience is obtained. The proper resilience is large enough for, in between two subsequent mechanical loads, pushing a substantial part of the lubricating fluid that has flowed through the at least one flow channel, back through the at least one flow channel. In particular for the cushioning element in the second embodiment and for the variation thereof, the proper resilience is small enough if it allows enough flow of the lubricating fluid into the at least one flow channel 37 as a result of increased pressure of the deformable filling caused by the mechanical load. The flow is considered enough if a significant increase of the viscosity of the deformable filling containing the solid bodies is obtained outside the flow channels 37. It may thus be clear that in the examples energy that is viscously dissipated in the deformable filling, within the envelope 10 and outside the flow channels 37, is much larger than energy stored in the deformable portions and/or is much larger than energy dissipated in the flow channels 37. The support member may contain nylon, EVA, and/or a plastics material.

The cushioning element in the embodiments described above, works as follows. When a mechanical load is applied on the cushioning element 4, 4A, or 4B, the pressure will develop in the deformable filling 12. As a result, the deformable portions 14 of the envelope 10 will be pushed outwards, so that the bulges 20 develop. During bulge development, the deformable filling 12 may flow into the bulges 20. In case the deformable filling 12 contains the solid bodies, these solid bodies may flow into the bulges as well. However, a size of at least part of the solid bodies, or of all the solid bodies, may be chosen relative to a size of the apertures 22 in such a way that only the lubricating fluid 36 flows into the bulges 20. Preferably, a dimension of the bulge in a direction of the flow of the deformable filling 12 is much larger than a dimension of the bulge transverse to the direction of the flow of the deformable filling 12. This can be achieved by having a dimension of the funnels 24 in a direction of the flow of the deformable filling 12 being much larger than a dimension of the bulge transverse to the direction of the flow of the deformable filling 12. More in general, this can be achieved by choosing the size, for example the area in the undeformed state, of the deformable portions 14 small enough.

After the mechanical load has been dissipated and/or elastically stored, the resilient nature of the deformable parts 14 may push the deformable filling 12 back so that the bulges, at least partly, disappear. An advantage of the closed end walls 26 of the cushioning element in the first embodiment is that gas pressure may develop in the funnels between the closed end walls and the bulges. The gas pressure development adds to dissipation but also helps to push the deformable filling 12 back after cushioning. After the bulges have, at least partly, disappeared, the deformable filling can dissipate a subsequent mechanical load.

In the examples described above, the Young's modulus of the solid bodies may be determined during unloading-loading loops by a micro indenter. Such a micro indentation method is known to the skilled person and a further description is deemed superfluous. The viscosity of the lubricating fluid and the viscoelastic properties of the viscoelastic fluid may be determined in a cone-plate rheometer. It will be clear to the skilled person that measuring conditions like shear rate and temperature preferably are similar to those that occur during cushioning. The viscosity of the lubricating fluid and the viscoelastic properties of the viscoelastic fluid can be determined at a temperature of 25 degree C. and a shear rate of 1 s$^{-1}$, in a cone-plate rheometer.

The invention is not limited to any embodiment herein described and, within the purview of the skilled person, modifications are possible which may be considered within the scope of the appended claims. Equally all kinematic inversions are considered inherently disclosed and to be within the scope of the present invention. The use of expressions like: "preferably", "more preferably", "in particular", "typically", "especially", etc. is not intended to limit the invention. The indefinite article "a" or "an" does not exclude a plurality. Features which are not specifically or explicitly described or claimed may be additionally included in the structure according to the present invention without deviating from its scope.

The invention claimed is:

1. Cushioning element for footwear, having a deformable filling and an envelope that encloses the deformable filling, wherein the envelope is arranged for forming at least one flow channel, wherein, in use, at least part of the deformable filling flows into the at least one flow channel as a result of increased pressure of the deformable filling caused by a mechanical load, wherein the deformable filling contains solid bodies and further contains a lubricating fluid for mutually lubricating the solid bodies, wherein the at least one flow channel is dimensioned for hindering entrance of the solid bodies into the at least one flow channel during cushioning, wherein the envelope has an elastically variable volume, and wherein the envelope is arranged for forming the at least one flow channel by developing, substantially reversibly, a bulge in at least one deformable portion as a result of increased pressure of the deformable filling exerted on the at least one deformable portion, caused by the mechanical load, and wherein the at least one flow channel is dimensioned for inhibiting entrance of the solid bodies into the at least one flow channel during cushioning.

2. Cushioning element according to claim 1, wherein the solid bodies are substantially spherically shaped.

3. Cushioning element according to claim 1, wherein a diameter of the solid bodies is in a range between 0.1 millimeter and 2 millimeter.

4. Cushioning element according to claim 1, wherein the solid bodies are, at least partly, made of teflon.

5. Cushioning element according to claim 1, wherein a volume ratio of the solid bodies and the lubricating fluid is in a range between 1 and 10.

6. Cushioning element according to claim 1, wherein the viscosity of the lubricating fluid is arranged for, and the at least one flow channel is further dimensioned for, obtaining that the at least part of the deformable filling that flows, in use, into the at least one flow channel as a result of the pressure of the deformable filling caused by the mechanical load, is formed by between 10% and 20% of a volume of the lubricating fluid of the deformable filling.

7. Cushioning element according to claim 1, wherein the square $A_c^2$ of a value of a cross-sectional area $A_c$ of the at least one flow channel, which cross-sectional area is transverse to a flow direction of the at least part of the deformable filling into the at least one flow channel, divided by the product of the viscosity $\eta$ of the lubricating fluid and a length L of the at least one of flow channel, is at least 0.001 cm$^3$/(Pa s) and/or at most cm$^3$/(Pa s), so that $0.001 \geq A_c^2/\eta L$ and/or $A_c^2/\eta L \geq 10$, and preferably is around 0.02 cm$^3$/(Pa-s).

8. Cushioning element according to claim 1, wherein a total number of the flow channels is in a range from 3 to 12.

9. Cushioning element according to claim 1, wherein the bulge can be developed repeatedly without fracturing.

10. Cushioning element according to claim 9, wherein the at least one flow channel is in fluid connection with a resilient member.

11. Cushioning element according to claim 9, wherein the at least one deformable portion has a reduced rigidity compared to a remaining portion of the envelope.

12. Cushioning element according to claim 11, wherein a size of the deformable portion is adapted for having a dimension of the bulge in a direction of the flow of the deformable filling into the bulge that is larger than a dimension of the bulge transverse to the direction of the flow of the deformable filling into the bulge.

13. Cushioning element according to claim 11, wherein the remaining portion of the envelope includes a support member that comprises at least one aperture to define the at least one deformable portion.

14. Cushioning element according to claim 13, wherein the support member has at least one funnel that extends from the aperture and is arranged to receive the at least one bulge.

15. Cushioning element according to claim 14, wherein the funnel has a restriction arranged for limiting a size of the bulge.

16. Cushioning element according to claim 15, wherein the restriction is formed by a closed end wall of the funnel.

17. Cushioning element according to claim 1, wherein the at least one deformable portion comprises a resilient material.

18. Cushioning element according to claim 1, wherein the at least one deformable portion is one of a plurality of mutually similar deformable portions, and wherein the bulge is one of plurality of mutually similar bulges, wherein the cushioning element is arranged for developing, substantially reversibly, the plurality of bulges from the respective deformable portions as a result of increased pressure of the deformable filling exerted on the plurality of deformable portions, caused by the mechanical load.

19. Cushioning element according to claim 1, wherein the deformable filling and/or the lubricating fluid is, at least partly, formed by at least one of a viscoelastic fluid and a viscoelastic solid.

20. Cushioning element according to claim 1, wherein the deformable filling and/or the lubricating fluid is, at least partly, formed by a shear-thickening fluid.

21. Cushioning element according to claim 1, arranged for absorbing a mechanical shock.

22. Insole provided with a cushioning element according to claim 1.

23. Footwear, provided with a cushioning element according to claim 1.

24. Cushioning element for footwear, having a deformable filling and an envelope that encloses the deformable filling, wherein the envelope is arranged for forming at least one flow channel, wherein the envelope is provided with at least one deformable portion that has a reduced rigidity compared to a remaining portion of the envelope, wherein the cushioning element is arranged for developing, substantially reversibly, a bulge in the at least one deformable portion as a result of increased pressure of the deformable filling exerted on the at least one deformable portion, caused by a mechanical load, and the bulge is formed in a cavity of a support member, and
    wherein the deformable filling contains solid bodies, and
    wherein the at least one flow channel is dimensioned for inhibiting entrance of the solid bodies into the at least one flow channel during cushioning.

* * * * *